(No Model.)
J. NEUKIRCHEN.
WASHING MACHINE.
No. 515,529.        Patented Feb. 27, 1894.
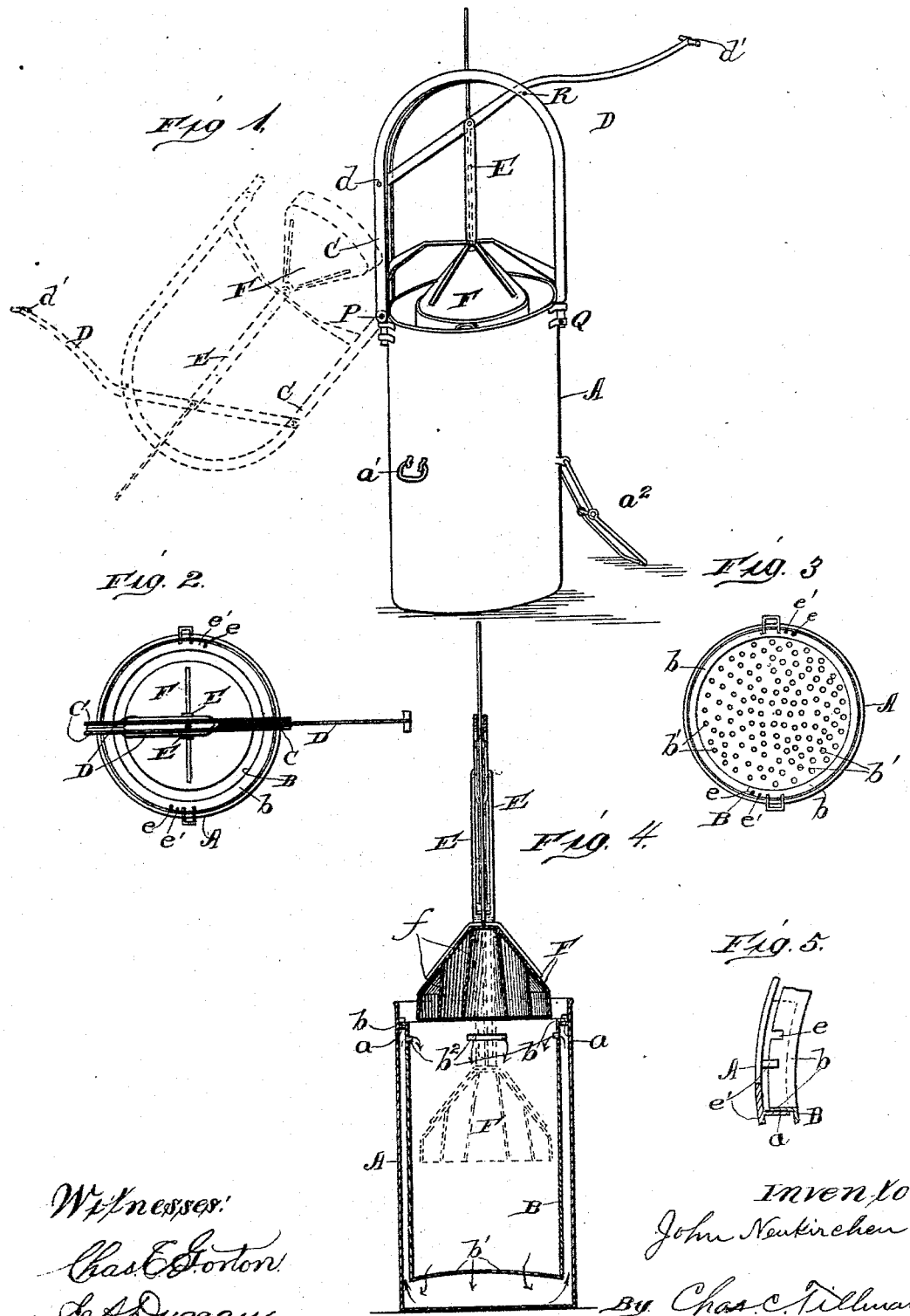
Witnesses:
Chas. E. Gorton
E. A. Duggan
Inventor:
John Neukirchen
By Chas. C. Tillman
Atty.

UNITED STATES PATENT OFFICE.

JOHN NEUKIRCHEN, OF DUSSELDORF, GERMANY.

WASHING-MACHINE.

SPECIFICATION forming part of Letters Patent No. 515,529, dated February 27, 1894.

Application filed October 23, 1893. Serial No. 488,927. (No model.)

*To all whom it may concern:*

Be it known that I, JOHN NEUKIRCHEN, a subject of the Emperor of Germany, residing at Dusseldorf, Germany, have invented certain new and useful Improvements in Washing-Machines, of which the following is a specification.

This invention relates to improvements in washing machines, and it consists in certain peculiarities of the construction, novel arrangement, and operation of the various parts thereof, as will be hereinafter more fully set forth and specifically claimed.

The objects of my invention are first, to provide a machine for washing clothes, which shall be simple and inexpensive in construction, effectual in operation, and strong and durable; and second, such a machine, in which the operation of cleansing the garments is performed with little effort on the part of the operator, and damage to the clothes or garments is prevented by reason of the fact that they are washed or cleansed without rubbing or friction by forcing water through the same.

In order to enable others skilled in the art to which my invention pertains to make and use the same, I will now proceed to describe it, referring to the accompanying drawings, in which—

Figure 1, is a perspective view of my invention, as it appears when ready for use. Fig. 2, is a plan or top view thereof. Fig. 3, is a similar view of the casing and vessel for the clothes or garments, with the plunger and its operating lever removed. Fig. 4, is a vertical sectional view of Fig. 1, and Fig. 5, is a detail plan view of a portion of the outer casing and interior bucket or receptacle.

Similar letters refer to like parts throughout the different views of the drawings.

A, represents a casing, which is made of any suitable size, form, and material, but preferably cylindrical in shape, and of sheet metal. Near its upper portion this casing is formed with an inwardly extending annular rim $a$, upon which rests the upper part of the bucket or receptacle B, for the clothes or garments. This bucket is formed at its top with an outwardly extending flange or annular rim $b$, to rest on the rim $a$, as is shown in Fig. 4, of the drawings. The bottom of the bucket or receptacle B, is formed with a number of perforations $b'$, to admit of the passage of air and water. Near its upper portion the said bucket or receptacle is provided with a number of openings $b^2$, through which water and air also pass. As is clearly seen in Fig. 4, of the drawings, the bucket or receptacle B, is supported by the rim $a$, in such a manner that its walls and bottom are a slight distance from the walls and bottom of the casing A, which allows the water and air to circulate therethrough. The outer surface of the casing A, is provided at suitable points with handles $a'$, for lifting or moving the machine, and on its front surface is provided with a foot-hold or stirrup $a^2$, upon which the foot of the operator is placed to steady the device when being operated, and also to prevent it overturning, when the plunger is removed or turned back to the position indicated by dotted lines in Fig. 1, for the insertion of the water or garments.

To the upper portion of the casing A, at one side at a point P are pivotally secured two uprights or braces C, which extend upward a suitable distance, and are then bent downward and attached to the opposite side of the casing, in any suitable manner but so that they can be disconnected therefrom as at Q—the braces being of inverted U-shape, as is clearly shown in Fig. 1. These uprights or braces are placed closely together, and in alignment with each other, and afford a guide for the operating-lever D, which is fulcrumed to said uprights at one end $d$, and is provided at its other end with a suitable handle $d'$, for operating the same. A pin can be passed through the braces at R for supporting the lever when not in use. At a suitable point on the lever D is pivotally secured a rod E, the upper portion of which extends beyond and between the uprights C, and the lower end thereof is secured to a plunger F, which as shown, is conical in shape and somewhat smaller in diameter than the bucket B, within which it fits and operates. The interior or cavity of the plunger is provided with a number of annular partitions $f$, which partake of the conical form of the plunger, or in other words are in the shape of an inverted funnel, which form distributes the air contained in the cavity of the plunger, and causes it to press equally on the surface of the water or garments.

In Fig. 5, I have shown in detail, a portion of the annular rim b, of the bucket B, and a part of the exterior casing A, and its rim a. As is seen in this view of the drawings, and also in Fig. 3, the casing A just above the rim a, is provided with a lug e′, which passes through an opening e, in the rim b, after which the bucket or vessel B, is turned slightly which locks the two rims together, as is apparent.

The operation of my device is simple and as follows: The plunger and its frame or braces C, are thrown into the position shown by broken lines in Fig. 1, when the clothes and water for washing the same, may be placed within the bucket or receptacle B; the plunger and its frame or braces is then raised to the position shown by full lines in Fig. 1, when the device is ready for operation. By moving the lever D, downward, the water within the bucket or receptacle B, and the cavity of the plunger F, will be compressed, and will force the water through the perforations b′, in the bottom of the said bucket, from whence it will pass between the walls of the bucket B, and the casing A, and again enter the bucket B, through the openings b², when the same operation may again be carried out.

Having thus fully described my invention, what I claim as new, and desire to secure by Letters Patent, is—

1. In a washing machine, the combination with an upright outer vessel, and a pair of parallel braces of inverted U-shape rising from the upper end of said vessel; of a lever pivoted between said braces at one side with its body extending between and guided by them at the other side, and a plunger connected with the lever and moving within said vessel, as and for the purpose set forth.

2. In a washing machine, the combination with an upright outer vessel, and a pair of parallel braces of inverted U-shape rising from the upper end of said vessel; of a lever pivoted between said braces at one side with its body extending between and guided by them at the other side, an upright rod whose upper end extends between and is guided by the braces at the top and whose body is pivoted to the lever, and a plunger carried by the lower end of the rod and moving within said vessel, as and for the purpose set forth.

In witness whereof I have hereunto set my hand this 7th day of October, 1893.

JOH. NEUKIRCHEN.

Witnesses:
CARL AUG. WELLER,
OTTO WAHLMANN.